Jan. 5, 1932.   W. B. McCALL   1,839,571
CONTROL MEANS FOR POWER TRANSMISSION DEVICES
Filed Nov. 7, 1928   3 Sheets-Sheet 1
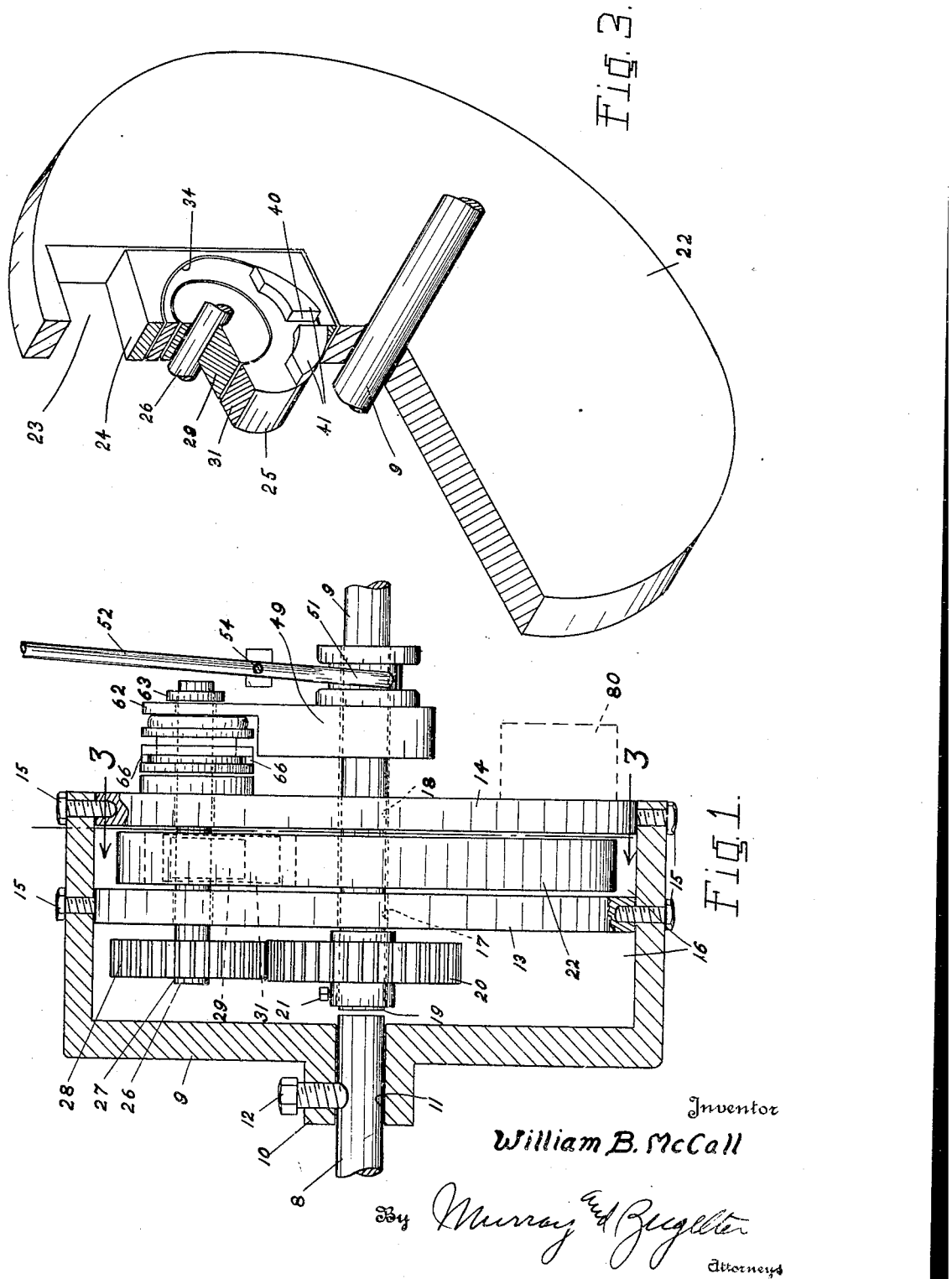
Inventor
William B. McCall
By Murray and Ziegler
Attorneys

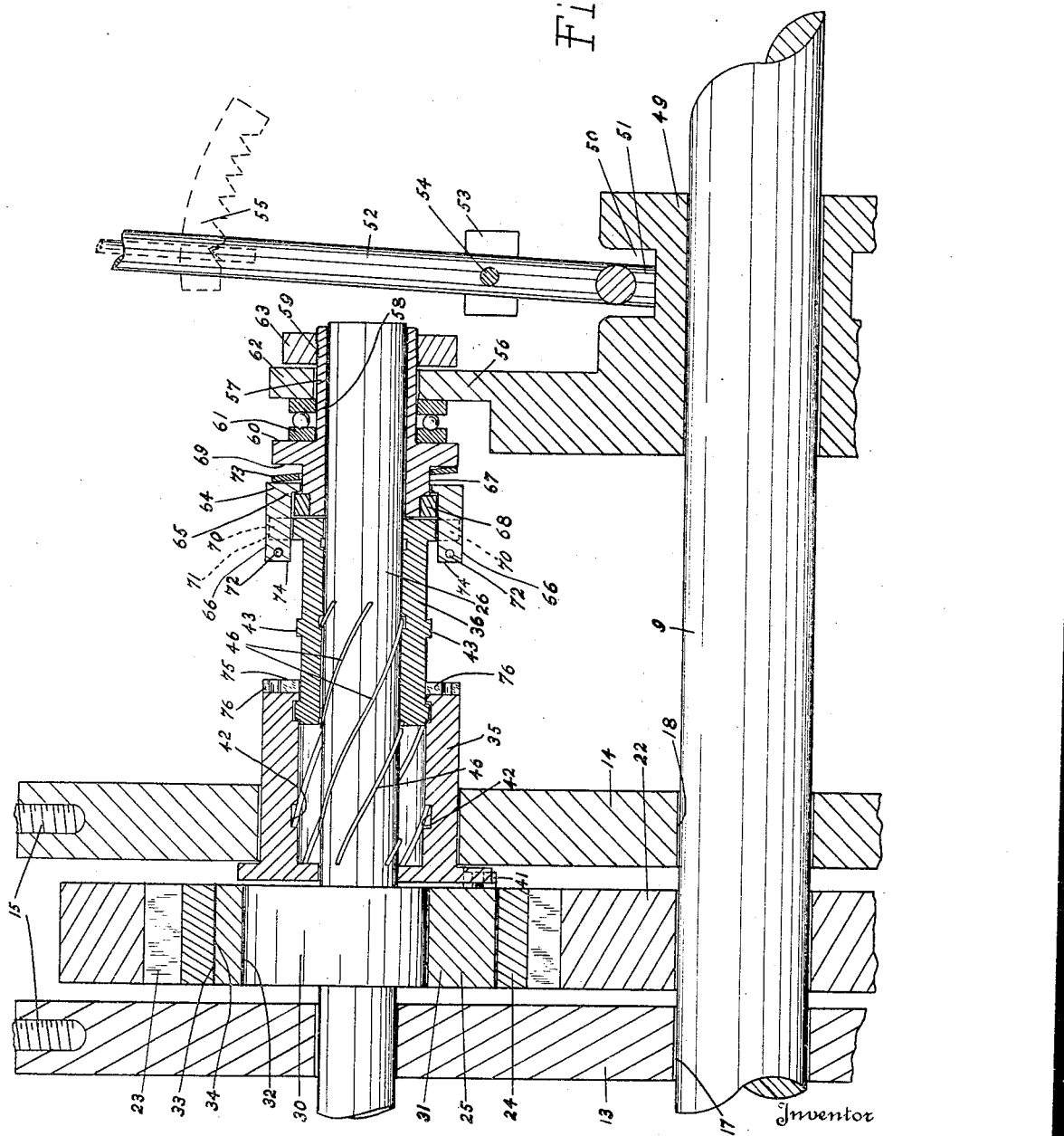

Patented Jan. 5, 1932

1,839,571

UNITED STATES PATENT OFFICE

WILLIAM B. McCALL, OF CINCINNATI, OHIO

CONTROL MEANS FOR POWER TRANSMISSION DEVICES

Application filed November 7, 1928. Serial No. 317,744.

This invention relates to an automatic transmission device of the inertia type disclosed by Letters Patent #1,680,899, issued to William B. McCall and dated August 14, 1928.

An object of this invention is to provide a variable control means for a device of the type above referred to, whereby the reaction thereof, under the strains of various loads, may be manually controlled.

Another object is to provide means whereby an inertia type transmission device may be adjusted, while in use, to operate effectively upon being subjected to loads of various magnitudes and resistances.

These and other objects are attained by the means described herein and disclosed in the accompanying drawings in which:

Fig. 1 is a view, partly in cross-section, showing the general arrangement of parts.

Fig. 2 is a cross sectional view showing in detail substantially the upper half of the mechanism shown in Fig. 1.

Fig. 3 is an isometric view taken on line 3—3 of Fig. 1.

Figure 4:
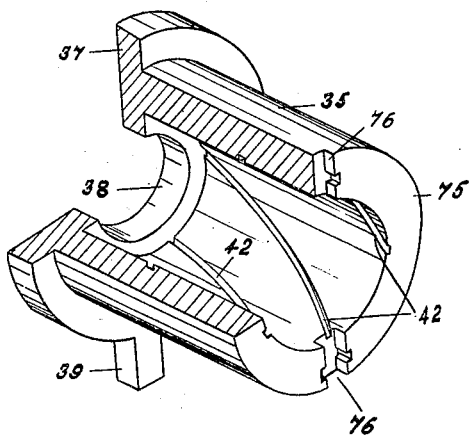
Fig. 4 is an isometric view, partly in cross section, of an outer sleeve forming a detail of the invention.
Figure 5:
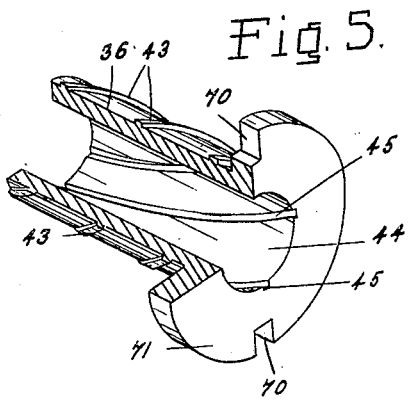
Fig. 5 is an isometric view, partly in cross section, of an inner sleeve member forming a detail of the invention.
Figure 6:
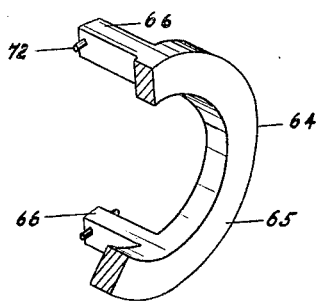
Fig. 6 is an isometric view, part thereof being broken away, of a locking ring forming a detail of the invention.

In the class of automatic power transmission devices to which the present invention appertains, it has been found advantageous, under certain circumstances, to provide an easily accessible means for varying the sensitiveness of the device according as the load thereon is diminished or increased. By providing such means, the power transmission device may be rendered semi-automatic, or full automatic, as desired. It should be apparent from the disclosures in the above mentioned McCall patent, that the sensitiveness of the device disclosed therein may be varied by altering the weight of the flywheel, by providing spur gears of different diameters or ratios, by changing the throw of the cam or crank, and possibly by other means. These changes or substitutions, however, can not be effected without dismantling the mechanism to some extent. It is an object of this invention, therefore, to provide a convenient manually controlled mechanism for adjusting or varying the throw of the cam at will, whether the device is in motion or at rest.

Reference is made to Fig. 1 wherein 8 and 9 represent drive and driven shafts respectively. Fixedly secured to drive shaft 8 is a cylindrical drum or housing 9 provided with a central hub 10 having a bore 11 adapted to receive shaft 8. Shaft 8 may be securely held within the bore by any suitable means such as a set screw 12. The housing is therefore adapted to rotate bodily with the shaft 8.

A pair of spaced parallel bearing supporting members preferably in the form of discs or circular plates 13 and 14 are fixedly mounted within the housing by means of bolts or the like 15. Said bearing supporting members are disposed transversely of the cylindrical housing and one of them may be closely fitted to form with the housing a reservoir 16 for lubricant.

The plates or discs 13 and 14 are provided with bores or bearings 17 and 18 in alignment with bore 11 of the housing. Said bores or bearings are adapted to rotatably receive the driven shaft 9 one end 19 of which is adapted to receive a spur gear 20. The spur gear is fixedly secured to the end of the shaft by any suitable means such as a set screw 21 passing through the hub of the gear. By disposing the end 19 of shaft 9 in close proximity with the end of shaft 8 as shown in Fig. 1, the driven shaft 9 may be precluded from longitudinal movement in bearings 17 and 18 of the bearing supports. In practice, the particular means for accomplishing the above may be replaced by ball or roller thrust bearing means of suitable design. Anti-friction bearings may of course be used in such other instances as may be practicable.

A flywheel 22 is freely mounted upon shaft 9 at a point intermediate the bearing supporting members 13 and 14. Said flywheel is mounted for oscillation relative to shaft 9 by a means presently to be described. The flywheel or oscillatable member 22 is provided with a radial slot or opening 23 adapted to receive therein a reciprocable sliding bearing block 24 in which is rotatably mounted a cam device indicated generally by 25. The cam device 25 performs the function of cam 26 shown in Fig. 4 of the McCall patent herein referred to. The cam mechanism of the said patent is different from the cam mechanism of the present invention, in that the latter is provided with means for varying or changing the throw of the cam, thereby varying the degree of oscillation imparted to the flywheel.

The cam mechanism of the present invention comprises a cam shaft 26 at one end 27 of which is fixedly mounted a spur gear 28 constantly in mesh with spur gear 20 mounted on driven shaft 9. A circular cam 29 having an exterior bearing surface 30 is eccentrically mounted on the cam shaft in fixed relation therewith. The cam may be integral with the cam shaft, if desired, and may be termed the inner cam. An outer cam 31, circular in cross section and having a circular bore or bearing 32 disposed eccentrically to the central axis of the outer cam, receives in bore 32 thereof the inner cam. The inner and outer cams are adapted for relative rotatory motion, the exterior bearing surface 30 of cam 29 being slidable on the walls of bore 32 of the outer cam.

Bearing block 24 is provided transversely thereof with a circular bore 34 adapted to receive freely the outer cam member 31 and provides a bearing in which the member 31 may rotate. Anti-friction means of suitable design may be employed between the various cam elements and bearing block to insure smooth action and to prevent undue wear. It should be apparent from the foregoing that outer cam member 31 is rotatable relative to block 24 and that inner cam member 29 is rotatable relative to outer cam 31.

The relation of the inner cam to the outer cam is such that when they are rotated relatively to one another, the toe and heel of the outer cam are disposed at various distances from the center of cam shaft 26. When the cams are positioned as shown in Fig. 2 with the toe of one cam nearest the heel of the other cam, the relation of the outer cam to the cam shaft is such that the throw of the outer cam is zero. In other words, the cams when in this position present a condition wherein the true central axis of the outer cam is coincident with the axis of the cam shaft. The outer cam member 31 therefore has no value as a cam and when the assembly comprising the cam shaft and cams 29 and 31, are rotated relative to the bearing block, no reciprocatory movement of the block is produced.

The relationship of the cams having been fully described in the foregoing, it will be convenient hereinafter to refer to members 29 and 31 as cam members, and to refer to the assembly comprising said cam members, as a compound cam.

Means are provided for manually controlling the relationship of one cam member to the other for varying the throw of the compound cam, and for locking the cam members in adjusted relative positions. Said means comprise a pair of telescoping sleeves 35 and 36 adapted for relative reciprocatory and partial rotatory movement. Sleeve 35 comprises a tube provided at one end thereof with a flange portion 37 having a central bore 38 for rotatably receiving cam shaft 26. The flange is provided with a radially outwardly extending tongue or key 39 adapted for sliding movement in a groove or way 40 formed on one face of the cam member 31. One method of forming said groove is shown in Fig. 3, wherein is shown a pair of integral lugs 41 spaced to form groove 40. The tongue or key of sleeve 35 is at all times disposed within the groove 40 for the purpose of precluding relative rotatory movement of the sleeve and cam member 31.

In the bore of the sleeve 35 are formed a plurality of spiral grooves 42. Sleeve 36 which is adapted to enter the bore of sleeve 35, is provided with complementary external spiral threads or keys 43 which engage the grooves 42 for insuring relative movement of the sleeves when sleeve 36 is reciprocated along cam shaft 26. Small or inner sleeve 36 is provided in the bore 44 thereof with a plurality of similar grooves or ways 45 adapted to receive complementary ribs or keys 46 formed on the cam shaft 26. It should be noted that the latter set of keys and grooves are reversed relative to the keys and grooves 42 and 43, whereby to effect rotation of the cam shaft and sleeve 35 in opposite directions. It should be clear therefore that as sleeve 36 is reciprocated relative to cam shaft 26, the shaft will be rotated in one direction, while the sleeve 35 will rotate in the opposite direction. As cam member 29 is movable with the cam shaft, and cam member 31 is movable with sleeve 35, it should be clear that the cam members will be relatively moved for varying the throw of the compound cam. Said relative movement, governed by the pitch of the grooves and keys above referred to, should not exceed 180 degrees. By providing the right and left hand spiral keys and grooves, the pitch thereof may be coarse, thereby insuring great strength of the sleeve members.

The manual means for reciprocating sleeve 36 comprises a collar or sleeve 49 slidably mounted on driven shaft 9. Collar 49 is provided with a circumferential groove 50 adapted to receive a yoke 51 formed on the lower end of an operating lever 52. Lever 52 is pivotally mounted on a supporting structure 53 as at 54, and if desired may be provided with a ratchet device 55 of any suitable type employed for retaining a lever in adjusted positions.

As the lever is moved about the pivotal mounting 54, clutch collar 49 is moved along driven shaft 9. The clutch collar is provided with an integral arm 56 by means of which the telescoping sleeve 36 is moved, through suitable connections about to be described, for adjusting the compound cam.

Slidably mounted on cam shaft 26 is a reciprocable shouldered sleeve 57 comprising a bearing portion 58 threaded on the free end thereof as at 59. An abutting shoulder 60 on said sleeve serves to retain in position on the bearing portion, a thrust bearing 61 and the upper end 62 of arm 56, both of which encircle the bearing portion. A nut 63 is then screwed onto threads 59, thereby insuring movement of the shouldered sleeve 57 when the arm 56 is moved.

Connection is made between the sleeve member 57 and inner sleeve 36, by means of a locking ring 64 mounted upon a bearing portion 67 of sleeve member 57. The locking ring comprises a circular ring portion 65 provided with a pair of locking lugs 66 disposed coextensively with the axis of the ring. The ring is freely rotatable upon the bearing 67 and has longitudinal movement relative thereto limited by a shoulder 69, and a nut 68 secured to the sleeve member 57 adjacent the bearing portion 67.

The extending lugs 66 of the ring 64 are adapted to be slidably received by cooperative slots or openings 70 formed in a flange 71 of sleeve 36, for precluding relative rotatory movement of the sleeve and ring. Limited reciprocatory movement thereof is permitted by the provision of pins or stops 72 carried by the lugs adjacent the free ends 74 thereof as shown in Fig. 2. It should be noted that yielding means, such as a spring member 73, constantly urges the ring forwardly whereby to retain the lugs 66 in extended position. In this position, the stops 72 are spaced from the flange 71 whereby to permit limited movement of the sleeves 57 and 36.

The purpose of the locking ring and its mounting means above described, is to effect an interlocking of the sleeves 35 and 36 when sleeve 36 is disposed substantially fully within sleeve 35. It should be noted that upon actuation of lever 52 and consequent advancement of small sleeve 36 into large sleeve 35, the lugs 66 will abut the annular abutting surface 75 of sleeve 35 at points near the lug receiving slots 76 formed in the abutting surface. Upon further advancement of the sleeve 36, the lugs will slide along the abutting surface, compressing spring 73 and then dropping into receiving slots 75. The lugs are retained in position within said slots by the yielding action of the spring. As long as said lugs are in the engaged position, the sleeves 35 and 36 are precluded from relative movement. When it is desired to return the device to the condition shown in Fig. 2, the operating lever 52 is actuated whereupon the lugs are first withdrawn from the slots for severing the locking relation. Further movement of the lever serves to move sleeve 36 from the bore of sleeve 35.

In the operation of the power transmission device, the oscillatable flywheel member 22 functions in substantially the same manner as disclosed in the McCall patent herein referred to. By means of the control mechanism of this invention, the device may readily be adjusted to operate upon loads or resistances of different magnitudes. When starting a load, control lever 52 is moved from the neutral position shown in Fig. 2. The throw of the compound cam is thereby increased, in a manner previously described, until the flywheel is oscillated sufficiently to cause movement of the load in a manner described in detail in the above mentioned McCall patent. A light load, being easily moved or started, requires only slight oscillation of the flywheel member to start the load, whereas a heavy load requires greater oscillation of the flywheel member. The compound cam therefore may be adjusted to effect the required oscillation of the flywheel. The manner of relatively moving the cam members to vary the throw of the compound cam has been set forth in detail in a previous paragraph.

It is to be understood that one or more compound cam mechanisms, similar to the one described and disclosed herein, may be employed to cooperate with one another for oscillating the flywheel. The plurality of cam mechanisms may be controlled from one operating lever. If desired, a counterbalance 80 may be provided for retaining the flywheel in a balanced condition. Counterbalance 80 may be of the shifting weight type.

It should be observed that in some instances it may be advantageous to eliminate the interlocking mechanism comprising lugs 66. Locking ring 64 may then be replaced by means rigidly connecting sleeves 57 and 36.

It is to be understood that various modifications and changes may be made in the structural details of the device without departing from the spirit and scope of the invention as set forth in the appended claims.

What is claimed is:

1. In a device of the class described, the combination of drive means and a driven means, a connection for the drive and driven means comprising an oscillatable member, rotatable means associated with the oscillatable member, the drive and the driven means, for oscillating the oscillatable member upon applying resistance to movement of the driven means, said rotatable means comprising a cam shaft, an adjustable cam on the cam shaft, and means for manual adjustment of the cam for varying the throw of the cam whereby to vary the amount of oscillation of the oscillatable member.

2. In a power transmission device the combination of a drive shaft, a driven shaft, a support means for the driven shaft said support means being movable with the drive shaft, an oscillatable member mounted for rocking movement relative to the driven shaft, and a variable throw means movable with the drive shaft and having connection with the driven shaft for controlling oscillation of the oscillatable member.

3. In a power transmission device the combination of a drive shaft, a driven shaft, a support means for the driven shaft said support means being movable with the drive shaft, an oscillatable member mounted for rocking movement relative to the driven shaft, a variable throw means movable with the drive shaft, a connection between the variable throw means and the driven shaft for controlling oscillation of the oscillatable member, and means for adjusting the variable throw means during operation of the device.

4. In a device of the class described the combination of drive means and a driven means, means for transmission of power between the drive and driven means including an oscillatable member and a variable throw mechanism, cooperating for controlling oscillations of the oscillatable member, and means actuatable while the device is in operation for manually varying the throw of the variable throw mechanism.

5. In a device of the class described the combination of a drive means and a driven shaft for rotation at different rates of speed, an oscillatable member, a variable throw mechanism cooperating with the oscillatable member for controlling oscillation of the oscillatable member, power transmission means arranged to rotate the variable throw mechanism bodily relative to the oscillatable member upon rotation of the drive means and driven shaft at different rates of speed, and means actuatable while the device is in operation for varying the throw of the variable throw mechanism.

6. In a device of the class described the combination of a rotatable drive means and a driven shaft, an oscillatable member rockingly mounted relative to the driven shaft, a rotatable cam shaft mounted for movement with the drive means, means for rotating the cam shaft, a variable throw cam on the cam shaft and cooperating with the oscillatable member for movement thereof relative to the driven shaft, and means for varying the throw of the variable cam.

7. In a device of the class described the combination of a rotatable drive means and a driven shaft, an oscillatable member rockingly mounted relative to the driven shaft, a rotatable cam shaft mounted for movement with the drive means, means on the driven shaft for rotating the cam shaft, a variable throw cam on the cam shaft and co-operating with the oscillatable member for movement thereof relative to the driven shaft, and means for varying the throw of the variable cam.

8. In a device of the class described the combination of a pair of members rotatable at different rates of speed, a weight member mounted for rocking movement relative to the pair of members, an eccentric movable with one of the rotatable members and co-operating with the weight member for imparting rocking movement thereto, power transmission means on the other rotatable member adapted to actuate the eccentric upon relative rotation of the pair of rotatable members, and means comprising telescoping sleeves for manually controlling rocking movement of the weight member.

9. In a device of the class described the combination of a pair of members rotatable at different rates of speed, a weight member mounted for rocking movement relative to the pair of members, an eccentric movable with one of the rotatable members and cooperating with the weight member for imparting rocking movement thereto, power transmission means on the other rotatable member adapted to actuate the eccentric upon relative rotation of the pair of rotatable members, means comprising telescoping sleeves for manually controlling rocking movement of the weight member, and means for locking said sleeves in adjusted positions.

10. In a device of the class described the combination of a pair of members rotatable at different rates of speed, a weight member mounted for rocking movement relative to the pair of members, a variable eccentric unit comprising telescoping sleeves movable with one of the rotatable members and co-operating with the weight member for imparting rocking movement thereto, power transmission means connecting the other rotatable member and the eccentric for actuating the eccentric upon relative rotation of the pair of rotatable members, and manually adjustable means associated with the telescoping sleeves for controlling variation of the eccentric.

11. In a device of the class described the combination of drive means and a driven means rotatable at different rates of speed, a weight member mounted upon the driven means for rocking movement, a variable cam mounted for rotation with the drive means and cooperating with the weight member for imparting rocking movement thereto, power transmission means between the driven member and the cam, and means comprising telescoping relatively rotatable sleeves for varying eccentricity of the cam for controlling rocking movement of the weight member.

In testimony whereof, I have hereunto subscribed my name this 1st day of November, 1928.

WILLIAM B. McCALL.